(12) United States Patent
Yamamoto et al.

(10) Patent No.: US 6,970,539 B2
(45) Date of Patent: Nov. 29, 2005

(54) REMOTE OPERATION SYSTEM FOR AIR CONDITIONING APPARATUSES, REMOTE OPERATING METHOD FOR AIR CONDITIONING APPARATUSES AND BASE STATION FOR PERFORMING REMOTE OPERATION OF AIR CONDITIONING APPARATUSES

(75) Inventors: Mitsuhiko Yamamoto, Osaka (JP); Akira Murai, Osaka (JP); Nobuhiro Imada, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/296,642

(22) PCT Filed: May 21, 2001

(86) PCT No.: PCT/JP01/04234

§ 371 (c)(1),
(2), (4) Date: Nov. 27, 2002

(87) PCT Pub. No.: WO01/93623

PCT Pub. Date: Dec. 6, 2001

(65) Prior Publication Data

US 2003/0131089 A1    Jul. 10, 2003

(30) Foreign Application Priority Data

May 30, 2000    (JP) .............................. 2000-160225

(51) Int. Cl.[7] .............................................. H04M 11/00
(52) U.S. Cl. .............................. 379/102.05; 379/102.01
(58) Field of Search ...................... 379/102.01–102.07, 379/106.01, 106.02, 90.01; 340/825.69, 825.72; 709/223

(56) References Cited

U.S. PATENT DOCUMENTS

| | | | |
|---|---|---|---|
| 4,918,615 A | | 4/1990 | Suzuki et al. |
| 5,809,118 A | * | 9/1998 | Carmello et al. ...... 379/102.02 |
| 6,009,153 A | * | 12/1999 | Houghton et al. ..... 379/102.02 |
| 6,415,023 B2 | * | 7/2002 | Iggulden ................ 379/102.03 |
| 6,496,575 B1 | * | 12/2002 | Vasell et al. ........... 379/102.05 |

FOREIGN PATENT DOCUMENTS

| | | | | |
|---|---|---|---|---|
| EP | 0 959 606 A2 | | 11/1999 | |
| JP | 11-122679 | | 4/1999 | |
| JP | 11-127260 | | 5/1999 | |
| JP | 11-202931 | | 7/1999 | |
| JP | 2000059867 A | * | 2/2000 | ............ H04Q 9/00 |
| WO | WO 97/25808 | | 7/1997 | |
| WO | WO 99/34339 | | 7/1999 | |
| WO | WO 9944353 A1 | * | 9/1999 | .......... H04M 11/02 |

* cited by examiner

Primary Examiner—Wing Chan
(74) Attorney, Agent, or Firm—McDermott Will & Emery LLP (57) ABSTRACT

Connection is established from a communication device having a plurality of platforms, such as a push-button-type telephone 13, a personal computer 14 and a cellular phone 15, to a base station 12 through a public line network 22 and the Internet 20, and an operation guidance is given by means of a voice guidance or a Web page from base station 12, so that the base station 12 remote-controls an electric apparatus 11 in accordance with the user's operation on the communication devices 13 to 15. The guide program, voice guidance and Web pages in the base station 12 are made to be updateable in storing operations 24a, 27a, 27b, 27c in the base station 12, so that it is possible to easily add a function thereto and also change the functions. It becomes possible to correspond to various platforms, easily add various functions, and also to easily update the operation menu.

17 Claims, 5 Drawing Sheets

REMOTE OPERATION SYSTEM FOR AIR CONDITIONING APPARATUSES, REMOTE OPERATING METHOD FOR AIR CONDITIONING APPARATUSES AND BASE STATION FOR PERFORMING REMOTE OPERATION OF AIR CONDITIONING APPARATUSES

TECHNICAL FIELD

The present invention relates to a remote-control system of an electric apparatus in which a driving control operation can performed by a predetermined operation unit when the user is at home, performing a remote-control the electric apparatus from an external communication device when the user is out, a remote control method of an electric apparatus, and a base station performing a remote control of an electric apparatus.

BACKGROUND ART

In electric apparatuses, some of them can be on-off operated from a remote place through push button operations on a telephone when the user is out.

For example, in an air conditioning apparatus serving as such an apparatus, the user makes a phone call on a push-button-type telephone when he or she is out, so as to confirm the operation state of the apparatus and switch the operation/stop states through push-button operations.

Figure 5:
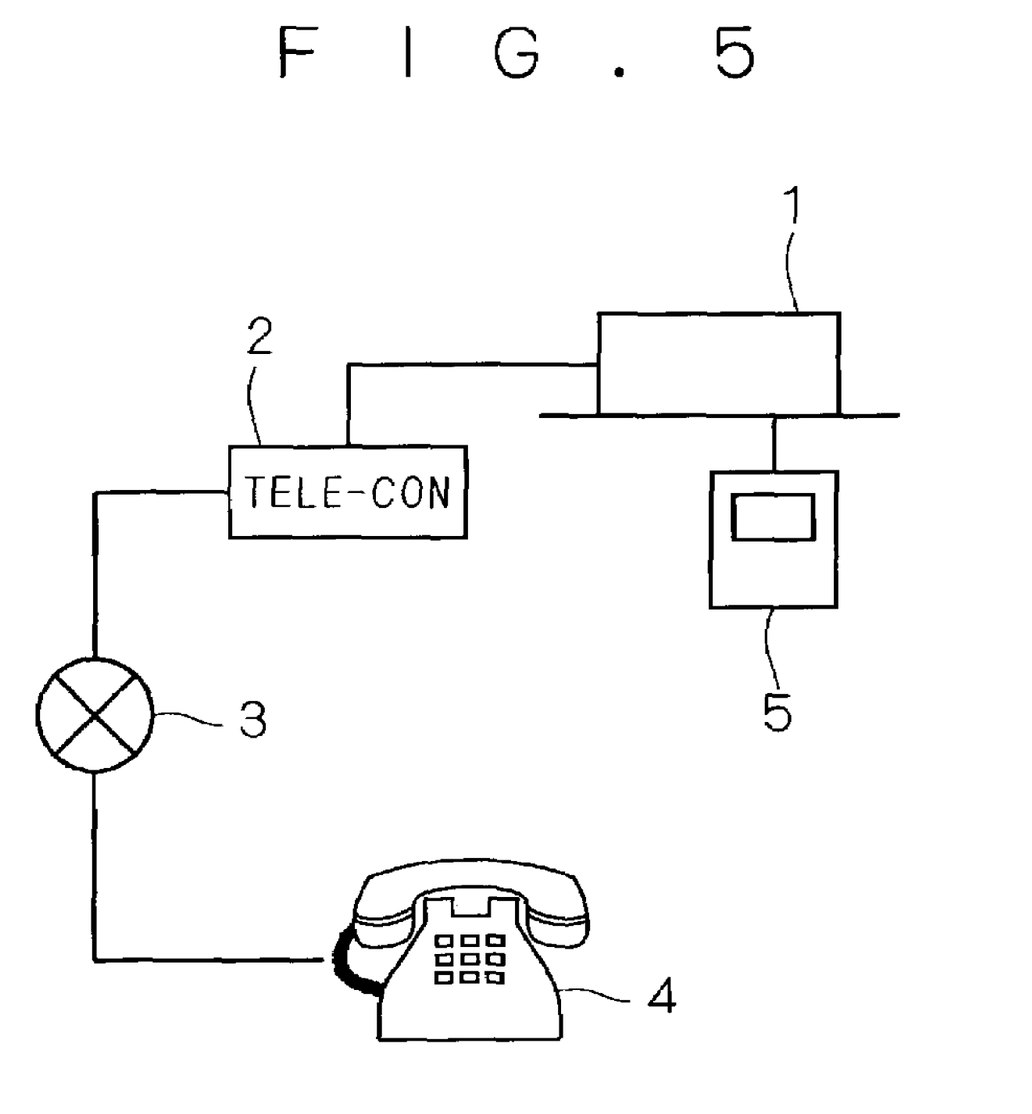
FIG. 5 is a block diagram that shows the outline of a conventional remote control system of an electric apparatus.

More specifically, as shown in FIG. 5, a tele-controller device 2 (hereinafter, referred to as "tele-con") is connected to an air conditioning apparatus 1, and this tele-con 2 is connected to a public telephone line network 3. Then, a dial-up connection is made to the tele-con 2 from a push-button-type telephone 4 located at a remote place, and after the personal identification and the like have been made by inputting a pass number, a predetermined signal is transmitted to the tele-con 2 by push-button operations through the push-button-type telephone 4 so that the on-off control is carried out on the air conditioning apparatus 1. Here, a controller 5, which is used by the user at home to control the air conditioning apparatus 1 in the vicinity thereof, is connected to the air conditioning apparatus 1; thus, modes are switched between a home-use mode and a tele-control mode (hereinafter, referred to as "tele-con mode") by using this controller 5.

Therefore, in the case of the home-use mode, the user operates the controller 5 at home so as to control the air conditioning apparatus 1, while, in the case when the user is out, after the mode has been switched to the tele-con mode by the controller 5, the remote control is carried out on the air conditioning apparatus 1 by using a push-button-type telephone 4 located at a remote place through the public telephone line network 3 and the tele-con 2. Here, the functions of the remote control are basically determined by a software program that is built in the tele-con 2.

However, in the above described conventional methods, when there is no push-button-type telephone 4 where the user goes out, no operation is available. However, in recent years, along with the developments of the Internet, new communication media or communication apparatuses such as cellular phones and personal computers with communication functions have been generally used, and there have been ever-increasing demands for methods of remote-control operations of electric apparatuses suitable for these various platforms.

Moreover, in some cases, there is a demand for adding an operation menu for remote-controlling that has not been prepared at the time of the shipment of each electric apparatus. For example, in the case of the air conditioning apparatus 1 serving as the electric apparatus, there are some demands for adding automatic setting functions for rainy season and dry season in winter in humidity adjustments and for adding new automatic temperature adjustments and the like to the operation menu so as to adjust to any un-precedential weather due to the current abnormal weather. In such cases, in the above-mentioned prior-art methods in which all the remote control functions are defined by software programs inside the tele-con 2, even when the maker of an electric apparatus attempts to add and update an operation menu, functions and the like, the maker needs to recall all the tele-cons 2 or go to the installation sites of the tele-cons 2 so as to update the inner software program. Therefore, actually, it has been difficult to add new functions and update the operation menu in remote control systems.

DISCLOSURE OF THE INVENTION

<Object of the Invention>

The present invention has been devised to solve the above described problems, and an object thereof is to provide a remote control system of an electric apparatus which is suitably applied to various platforms, and makes it possible to add various functions and also to update operation menus easily, a remote control method of an electric apparatus and a base station that carries out remote control operations on an electric apparatus.

<Configurations and Effects of the Invention>

A first aspect of the present invention is provided with a base station (12) which carries out a remote control operation on an electric apparatus (11) having a predetermined driving system (11a) through a predetermined communication network (25) and communication devices (13 to 15) which give instructions of the remote control operation of the driving system (11a) to the base station through predetermined communication paths (20, 22), and the base station carries out the remote control operation on the basis of an updateable software program installed therein and the instructions.

With respect to the remote control method of the electric apparatus is provided with a first step of transmitting a signal for giving an instruction of remote control of the electric apparatus from the communication apparatuses (13 to 15) to a predetermined base station (12) connected to the communication devices (13 to 15) through predetermined communication paths (20, 22), and a second step of transmitting a remote control signal used for carrying out the remote control operation from the base station (12) to the electric apparatus (11) through a predetermined communication network (25) on the basis of an updateable software program stored in the base station (12) and the signal.

In this first aspect, an instruction for a remote control operation of an electric apparatus is given through the communication devices so as to carry out the remote control operation of the electric apparatus from the base station, and in particular, the remote control operation by the base station is carried out on the basis of an updateable software program; therefore, in comparison with a case in which the electric apparatus is directly remote-controlled by the user through the communication device without the base station interpolated in between, it is possible to easily add a remote control item to the electric apparatus and also to change the items easily within the base station by updating the software program; thus, it becomes possible to flexibly carry out changes on the remote control operation.

More preferably, the communication path includes a first communication path (22) that connects one kind of communication device (13) and the base station and a second communication path (20) which connects another kind of communication device (14, 15) and the base station.

Moreover, a second aspect of the present invention is provided with a base station (12) which carries out a remote control operation on an electric apparatus (11) having a predetermined driving system (11a) through a predetermined communication network (25), one kind of communication device (13) which gives an instruction for a remote control operation of the driving system (11a) to the base station (12) through the first communication path (22), and another kind of communication device (14, 15) that gives an instruction for a remote control operation of the driving system (11a) to the base station (12) through a second communication path (20) that is different from the first communication path (22), and the base station (12) carries out the remote control operation on the basis of the instruction.

In this second aspect, the remote control operation is executed on a push-button-type telephone through a public line network, and the remote control operation is also executed by using a personal computer and a cellular phone through the Internet; thus, it becomes possible to provide a wider range of communication path platforms to be selected by the user.

More preferably, the one kind of communication device (13) is a telephone, the first communication path (22) is a public line network, and the second communication path (20) is the Internet.

More preferably, the present aspect is provided with a first input unit (23) that inputs the instruction from the one kind of the communication device (13) through the first communication path (22) and a second input unit (21) that inputs the instruction from another kind of communication device (14, 15) through the second communication path (20), and the first input unit (23) gives a voice guidance to the telephone (13) so as to select the items of the remote control, and the second input unit (21) gives a display guidance to the another kind of communication device (14, 15) so as to select the items of the remote control.

More preferably, the another kind of communication device (14, 15) is at least one of the personal computer (14) and the cellular phone (15).

More preferably, the communication path includes a first communication path (22) which connects one kind of communication device (13) to the base station and a second communication path (20) which connects the another kind of communication device (14, 15) to the base station, and in this arrangement, the one kind of communication device (13) is a telephone, the another kind of communication device (14, 15) is at least one of the personal computer (14) and the cellular phone (15), and the first communication path (22) is a public line network, and the first input unit (23) gives a voice guidance to the telephone so as to select the items of the remote control, the second communication path (20) is the Internet, and the second input unit (21) gives a display guidance to the another kind of communication device (14, 15) so as to select the items of the remote control.

More preferably, the present aspect is provided with a first step of transmitting a signal for giving an instruction of remote control of the electric apparatus from the communication devices (13 to 15) to a predetermined base station (12) connected to the communication devices (13 to 15) through predetermined communication paths (20, 22), and a second step of transmitting a remote control signal used for carrying out the remote control operation from the base station (12) to the electric apparatus (11) through a predetermined communication network (25) on the basis of the signal, and in this arrangement, and the communication path includes a first communication path (22) that connects one kind of communication device (13) and the base station and a second communication path (20) which connects the another kind of communication device (14, 15), and the one kind of communication device (13) is a telephone, the another kind of communication device (14, 15) is at least one of the personal computer (14) and the cellular phone (15), and the first communication path (22) is a public line network, and the first input unit (23) gives a voice guidance to the telephone so as to select the items of the remote control, the second communication path (20) is the internet, and the second input unit (21) gives a display guidance to the another kind of communication device (14, 15) so as to select the items of the remote control.

More preferably, on the basis of an instruction given from the one kind of communication device (13) through the predetermined first communication path (22) or from another kind of communication device (14, 15) through the predetermined second communication path (20), the base station carries out a remote control operation on the electric apparatus (11) having the predetermined driving system (11a) through the predetermined communication network (25).

More preferably, the one kind of communication device (13) is a telephone, the first communication path (22) is a public line network, and the second communication path (20) is the Internet, and the present aspect is provided with a first input unit (23) that inputs the instruction from the one kind of the communication device (13) through the first communication path (22) and a second input unit (21) that inputs the instruction from another kind of communication device (14, 15) through the second communication path (20), and the first input unit (23) gives a voice guidance to the telephone (13) so as to select the items of the remote control, and the second input unit (21) gives a display guidance to the other kind of communication device (14, 15) so as to select the items of the remote control.

Moreover, in a third aspect of the present invention, the electric apparatus (11) is provided with a predetermined sensor so that information detected by the sensor is outputted to the one kind of the communication device (13) and the another kind of the communication device (14, 15) through the base station (12).

In this third aspect, it is possible to remote-control the air conditioning apparatus in accordance with the state detected by the sensor.

Preferably, the electric apparatus (11) is an air conditioning apparatus.

More preferably, in a fourth aspect of the present invention, a billing process for charge, which corresponds to the remote control through the base station, is carried out.

In this fourth aspect, it is possible to carry out a fair billing process easily in accordance with the remote control operation conducted by each user.

These and other objects, features, aspects and advantages of the present invention will become more apparent from the following detailed description of the present invention when taken in conjunction with the accompanying drawings.

BEST MODE FOR CARRYING OUT THE INVENTION

<Configuration>

Figure 1:
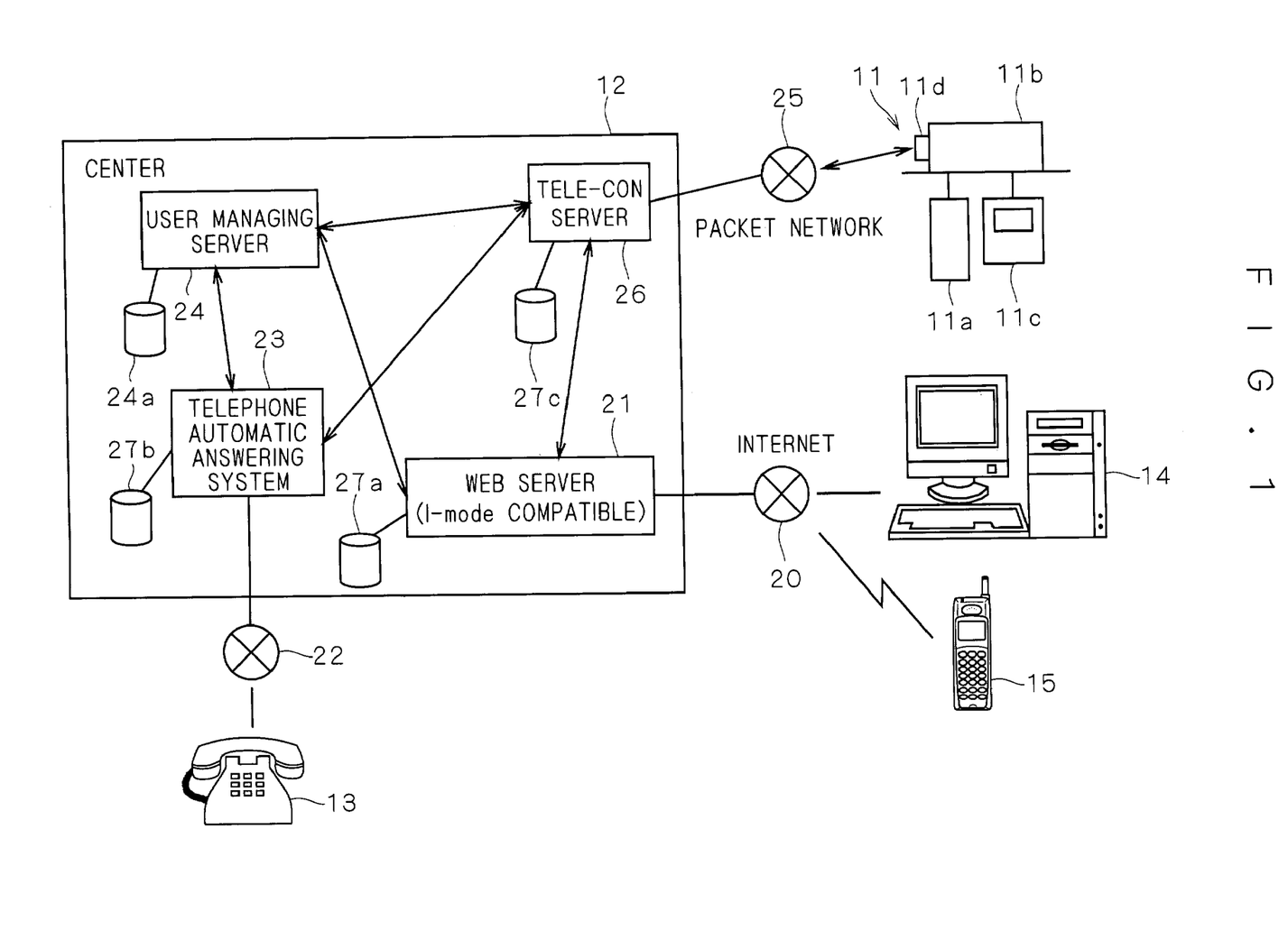
FIG. 1 is a block diagram that schematically shows a remote control system of an electric apparatus according to one embodiment of the present invention.
Figure 2:
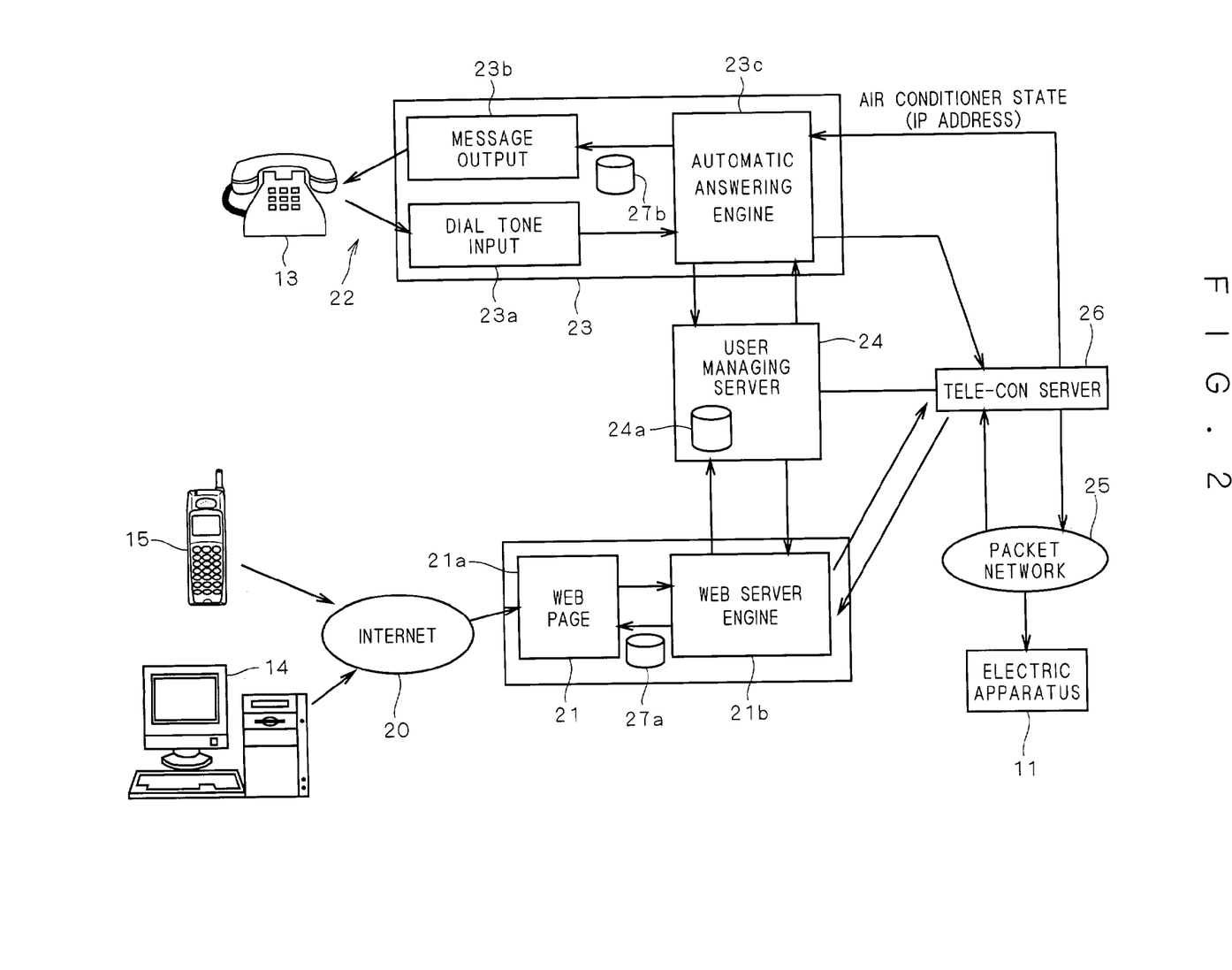
FIG. 2 is a block diagram that shows the remote control system of the electric apparatus according to the embodiment of the present invention.

FIG. 1 is a block diagram that schematically shows a remote control system of an electric apparatus 11 according to one embodiment of the present invention, and FIG. 2 is a block diagram that also shows its structure in detail.

As shown in FIG. 1, in this remote control system, an electric apparatus 11 and a base station 12 are connected to each other through a packet network (communication network) 25, and when the user is at home, the user directly controls the electric apparatus 11, while, when the user is out, the electric apparatus 11 is remote-controlled by utilizing communication devices forming various platforms such as a push-button-type telephone 13 and a personal computer 14 that is allowed to communicate through the Internet or a cellular phone 15 (hereinafter, referred to as "Internet communication devices 14, 15).

A typical example of the electric apparatus 11 is an air conditioning apparatus (hereinafter, referred to as "air controller"), which drive-controls a driving system 11a that is provided with a compressor, a blower fan and the like, by using a control system 11b. In the case of the operation when the user is at home, the user operates a predetermined remote controller (operation unit) 11c, etc., so that an operation signal is transmitted to the control system 11b, and on the basis of this operation signal, the control system 11b controls the driving system 11a. Moreover, the electric apparatus 11 is provided with a communication circuit 11d that is connected to the packet network 25 such as general public telephone lines, and is allowed to communicate with a base station 12 through the communication circuit 11d.

More specifically, the driving system 11a of the electric apparatus 11 is provided with actuators for various driving devices, such as the compressor and blower, and various sensors that detect the temperature, humidity and the like in the vicinity of the various driving devices. The various actuators are operated in accordance with operation signals sent from the control system 11b. Moreover, the various sensors carry out various detections every predetermined time on the basis of the operation signals from the control system 11b so that the results of the detections are transmitted to the control system 11b as detection signals.

The control system 11b of the electric apparatus 11 is provided with a ROM, a RAM, a CPU, not shown, and a storing device, and the CPU is operated in accordance with a processing sequence described in a software program (hereinafter, referred to as "device program") preliminarily stored in the storing device.

Moreover, the device program is defined so that, when detection signals from the various sensors of the driving system 11a are received, various driving control states are stored in the storing device every predetermined time in an updating manner as the detection result information in the form of data rows that have been subjected to various encoding processes, and, when a request signal for the state confirmation is given from the base station 12 through the packet network 25, the corresponding detection result information, stored in the storing device, is transmitted to the base station 12.

The base station 12 is provided with a Web server (second input unit) 21 connected to the Internet (first communication path) 20, a telephone automatic answering system (first input unit) 23 connected to a public line network (second communication path) 22, a user managing server 24 which manages users of the respective electric apparatuses 11, a tele-control server (remote control unit: hereinafter, referred to simply as "tele-con server") 26 that carries out remote control operations by individually making connections to the respective electric apparatuses 11 through the predetermined packet network 25.

The Web server 21 uses a computing system that is provided with a predetermined storing device 27a (FIG. 1) such as a CPU, a RAM and a hard disk drive, and is provided with a Web page data base 21a for storing Web pages (information page data) as a plurality of pieces of guide information that are supplied to the respective Internet communication devices 14, 15, and a Web server engine 21b (FIG. 2) which selects the Web pages in the Web page data base 21a and supplies the resulting pages to the respective internet communication devices 14, 15 through the Internet 20, and also gives control instructions to the tele-con server 26 (FIG. 2).

The Web page data base 21a stores a plurality of Web pages in the storing device 27a, and outputs the Web page requested by the Web server engine 21b to the corresponding Internet communication device 14, 15 through the Internet 20. The Web pages that are stored in the Web page data base 21a are pages edited so as to include image information, if necessary, in addition to character information, that is, for example, viewing information pages that are associated with so-called I-mode (trade mark: NTT Mobile Communication Network (K.K.)), described in, for example, a description language referred to as compact HTML. More specifically, the Web page includes an ID input page that gives a message requesting an input of the ID number and password as character information, a device state display page that indicates the state of each electric apparatus 11 detected by the sensors and a control item page that is used for selecting an item on which each electric apparatus 11 is remote-controlled. The Web page data base 21a is able to store the respective Web pages in the storing device 27a in an updateable manner.

In this case, the control item page is set to display items of remote control in a manner so as to be selected in a simple display panel within the cellular phone 15 by clicking one of a plurality of listed-up control items or highlighting the display color of one of item characters to a complementary color while scrolling the screen. In particular, the control item pages are prepared in a divided manner into a plurality of individual pages having a hierarchical structure. For example, with respect to control item pages for an air conditioner serving as the electric apparatus 11, the control items that are selectable in the control item page on the upper-most hierarchy include "selection of cooling or heating mode", "presence or absence of humidity setting", "wind power", "wind direction", "timer setting" and the like, and each of the items is linked to a sub-page such as "specifying page for selection of cooling or heating mode", "specifying page of presence or absence of humidity setting", "specifying page for wind power", "specifying page for wind direction" and "specifying page for timer setting", which is located on the lower hierarchy; thus, it is possible to select a more specific selection item. Moreover, the Web page is designed so as to display the information of detection results of each electric apparatus 11 that are given through the tele-con server 26 in a partially combined manner.

Additionally, the above-mentioned compact HTML can be viewed by a cellular phone compatible with the I-mode (trade mark: NTT Mobile Communication Network (K.K.)), and can also be viewed by using a Web-page-viewing browser application that is introduced into the personal computer 14; thus, it is possible to view the pages by using a wide range of devices of various platforms.

The Web server engine 21b of the Web serve 21 is a function element which is allowed to function through the operation of the CPU in accordance with the sequence defined by the predetermined program that has been preliminarily stored in the storing device 27a, and, upon receipt of a request for connection from the cellular phone 15 or the personal computer 14 through the Internet 20, outputs the ID input page in the Web page data base 21a through the Internet 20, and collates the ID number and the password inputted through the ID input page with a user managing table in the managing server 24 so as to identify the user. In the case when the identification of the user is negatively confirmed, a predetermined error message is outputted to the Internet communication devices 14, 15 as character information. In contrast, when the identification of the user is successfully confirmed, the device state display page is transmitted to the Internet communication devices 14, 15, and in response to a predetermined operation on the Internet communication device 14, 15, the corresponding control item page is transmitted to the Internet communication device 14, 15 to the Internet communication device 14, 15. When any one of the control items is further selected by the Internet communication device 14, 15, from the control item page thus transmitted, the selected control item is outputted to the tele-con server 26 as an instruction signal. Here, the software program that defines the functions of the Web server engine 21b is stored in the storing device 27a in an updateable manner.

The telephone automatic answering system 23, which is operated by the CPU (not shown) in accordance with a processing sequence described in the software program preliminarily stored in the predetermined storing device 27b (FIG. 1), is provided with a communication function for communicating with each push-button-type telephone 13 through the public line network 22, and transmits a voice guidance to the corresponding Internet communication device 14, 15 as guide information through the public line network 22, and receives a dial-tone signal given from each Internet communication device 14, 15 in accordance with this voice guidance, and transmits an instruction signal for giving the corresponding instruction to the tele-con server 26 in accordance with the dial tone signal.

More specifically, the telephone automatic answering system 23 is provided with a dial tone input unit 23a for receiving a dial tone signal transmitted from the push-button-type telephone 13 as the result of a push button operation, a message output unit 23b which stores a plurality of predetermined messages, and transmits the corresponding message to the push-button-type telephone 13 as an analog-type voice guidance signal, and an automatic answering engine 23c which gives an instruction for transmitting a voice guidance signal to the message output unit 23b on the basis of the dial tone signal received by the dial tone input unit 23a, and also controls the tele-con server 26.

The dial tone input unit 23a converts the dial tone signal given from the push-button-type telephone 13 through the public line network 22 to predetermined coded data, and outputs the resulting data to the automatic answering engine 23c.

The messages of the voice guidance, stored in the message output unit 23b, include an ID input guide message for requesting inputs of the ID number and password to the user who is communicating through the push-button-type telephone 13, and a control item guide message which gives selection branches for controlling the electric apparatus 11 in accordance with a predetermined hierarchical structure in association with, for example, numbers in two digits. This control item guide message is composed of voice information that is preliminarily recorded by actual voice so as to guide the corresponding push-button operation through spoken language, and stored in the predetermined storing device 27b with predetermined identification codes applied to its header portion. Moreover, the voice guidance is generated with one portion of the detection result information of each electric apparatus 11 given through the tele-con server 26 being combined therein.

Upon receipt of a request for a dial-up connection from a push-button-type telephone 13 through the public line network 22, the automatic answering engine 23c gives an instruction to the message output unit 23b so as to transmit the ID input guide message to the push-button-type telephone 13, and carries out the identification of the user by collating the ID number and password transmitted from the push-button telephone 13 in response to this message with the user managing table in the user managing server 24. Here, in the case when the identification of the user is negatively confirmed, a predetermined error message is outputted to the push-button-type telephone 13 as voice information.

Then, the automatic answering engine 23c gives an instruction to the message output unit 23b so as to transmit a control item guide message in accordance with the predetermined hierarchical structure. Moreover, when any selection is made through a push-button operation on the push-button-type telephone 13 in accordance with the control item guide message, the automatic answering engine 23c gives an instruction to the message output unit 23b so as to send a control item guide message on the basis of the dial tone signal given to the dial tone input unit 23a, or further outputs an instruction signal to the tele-con server 26 so as to control the electric apparatus 11.

The user managing server 24, which, upon receipt of a request for connection from each of the Internet communication device 14, 15 and the push-button-type telephone 13 to the Web server 21 and the telephone automatic answering system 23, carries out the identifying process of each user who operates the Internet communication device 14, 15 or the push-button-type telephone 13 and makes the user associated with the corresponding electric apparatus 11, uses a computing system having a predetermined storing device 24a such as a hard disk drive, CPU, RAM and the like, and particularly stores pieces of information, such as ID numbers and passwords used for identifying the respective users of the electric apparatuses 11, telephone numbers used for dial-up connecting to the respective electric apparatuses 11, IP (Internet Protocol) addresses that are used by the Web server 21 upon connection to the personal computer 14 or the cellular telephone 15 through the Internet 20 and other information related to the users (for example, addresses, names, sexes, etc.), as user managing table. Moreover, on the basis of the contents of remote control operations and the number of the remote control operations, a billing charge for each user is calculated, and stored in the user managing table. For example, a predetermined billing charge is imposed on each of the remote control operations, and different billing charges are determined in accordance with the contents of instructions of the remote control operations.

Additionally, the user managing table of the user managing server 24 is used as data base relating to the user identification in the Web server 21 and the telephone automatic answering system 23, and, in particular, upon receipt of a request for user identification from the Web server 21 and the telephone automatic answering system 23, the telephone number of the electric apparatus 11 that is associated with the corresponding user in the user managing table is transmitted to the tele-con server 26.

The tele-con server 26 is a function element which is allowed to function through the operation of the CPU in accordance with the software program that has been preliminarily stored in the storing device 27c, and, after having been connected to the connection telephone number of the electric apparatus 11 supplied from the user managing server 24 through the packet network 25, generates a remote control signal preliminarily associated with the instruction signals given by the Web server 21 and the telephone automatic answering system 23, and transmits this remote control signal to the corresponding electric apparatuses 11 through the packet network 25.

Moreover, after temporarily storing the detection result information transmitted from each of the electric apparatuses 11 in the storing device 27c, the tele-con server 26 outputs the information to the Web page data base 21a as character data to be combined in one portion of the Web page stored in the Web page data base 21a of the Web server 21, and also outputs voice data to the telephone automatic answering system 23 so as to be combined into one portion of the voice guidance recorded in the telephone automatic answering system 23.

Here, the software program which defines the functions of the tele-con server 26 is stored in the storing device 27c in an updateable manner.

<Remote Control Processes by Push-Button Phone Operations>

Figure 3:
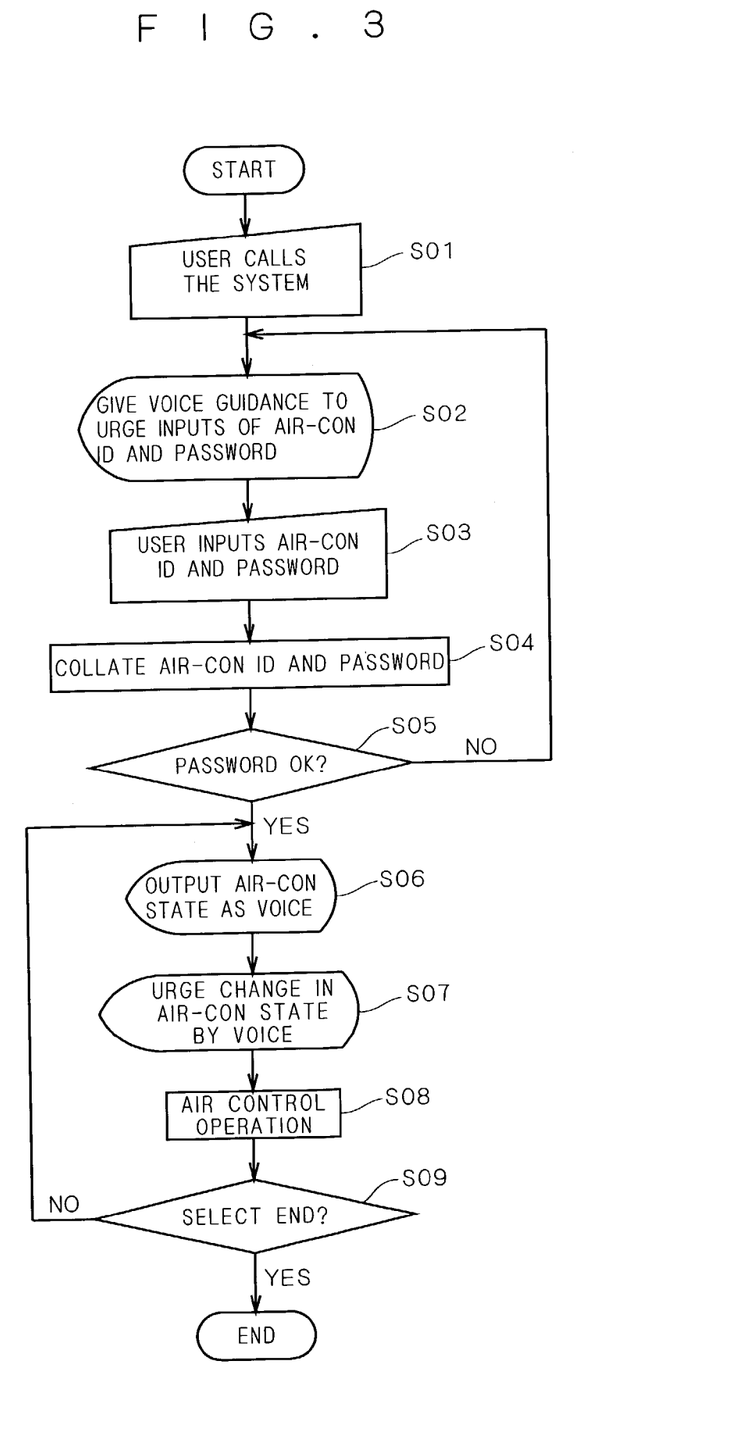
FIG. 3 is a flow chart that shows a remote control operation using push-button operations in the remote control system of the electric apparatus according to the embodiment of the present invention.

Referring to a flow chart of FIG. 3, the following description will discuss remote control processes by push-button phone operations, which are carried out when the user is out in the remote control system of the electric apparatus 11 having the above-mentioned arrangement. In this case, it is supposed that the detection result information detected by the various sensors has been transmitted to the tele-con server 26 from the electric apparatus (air conditioner) 11, and stored therein.

First, as shown in step S01 in FIG. 3, when the user is out, he or she carries out a push-button operation on a push-button-type telephone 13 such as a public telephone so as to make a phone call to the telephone automatic answering system 23 of the base station 12.

The message output unit 23b of the telephone automatic answering system 23 of the base station 12 gives a voice guidance at step S02 so as to urge the user to input the ID number (ID of the air conditioner) and the password.

In accordance with this voice guidance, after the user has inputted the ID number (ID of the air conditioner) and the password through the push-button operations of the push-button phone 13, dial tone signals corresponding to these push button operations are transmitted to the dial tone input unit 23a of the telephone automatic answering system 23 through the public line network 22.

When the dial tone signals corresponding to the air conditioner ID and the password are given to the dial tone input unit 23a of the telephone automatic answering system 23, the dial tone input unit 23a converts the dial tone signals to the air conditioner ID and the password as the predetermined encoded data, and outputs the resulting data to the automatic answering engine 23c. The automatic answering engine 23c transmits the resulting air conditioner ID and the password to the user managing server 24.

At step S04, the user managing server 24 collates the air conditioner ID and the password given from the telephone automatic answering system 23 with the data base in the storing device 24a so as to identify the user. Then, when it is determined at step S05 that the password is wrong, the processes from step S02 to step S04 are repeated. In contrast, when it is determined at step S05 that the password is correct, the sequence proceeds to step S06.

At step S06, the message, which corresponds to the detection result information stored in the tele-con server 26, for example, a message indicating that the room temperature is 30° C., is transmitted to the push-button-type telephone 13 through the public line network 22 from the message output unit 23b as a voice guidance. Then, at step S07, the message output unit 23b transmits a voice guidance to the push-button-type telephone 13 through the public line network 22 so as to urge the user to carry out the push-button operations relating to a state change in the air conditioner.

In accordance with this voice guidance, at step S08, the user carries out push-button operations corresponding to a change in the state of the air conditioner, for example, the start of a cooling operation, through the push-button-type telephone 13. The information relating to these push button operations are transmitted to the dial tone input unit 23a of the telephone automatic answering system 23 as dial tone signals through the public line network 22. Upon receipt of the dial tone signals with respect to the control operation of the air conditioner, the dial tone input unit 23a transmits these to the tele-con server 26 as encoded instruction signals. At this time, the telephone number of the electric apparatus 11 associated with the air conditioner ID is transmitted to the tele-con server 26 from the user managing server 24. On the basis of the telephone number given from the user managing server 24, the tele-con server 26 makes a connection to the communication circuit 11d of the electric apparatus 11 through the packet network 25, and also transmits a remote control signal to the communication circuit lid of the telephone automatic answering system 23, on the basis of the instruction signal given from the telephone automatic answering system 23.

In accordance with the remote control signal given from the tele-con server 26 of the base station 12 through the packet network 25 and the communication circuit 11d, the control system 11b of the electric apparatus 11 carries out a driving operation of the driving system 11a, for example, the start of a cooling operation.

Then, at step S09, a voice guidance is given so as to urge the user to carry out push button operations as to whether or not the push button operation at the push-button-type telephone 13 is terminated. In response to this guidance, when the user does not execute the corresponding push-button operation to terminate the push button operation, the sequence of operations of steps S06 to S08 is repeated. In contrast, when the user executes the corresponding push-button operation to terminate the push button operation, the operations are completed and the telephone connection is cut off.

<Remote Control Processes Through the Internet>

Figure 4:
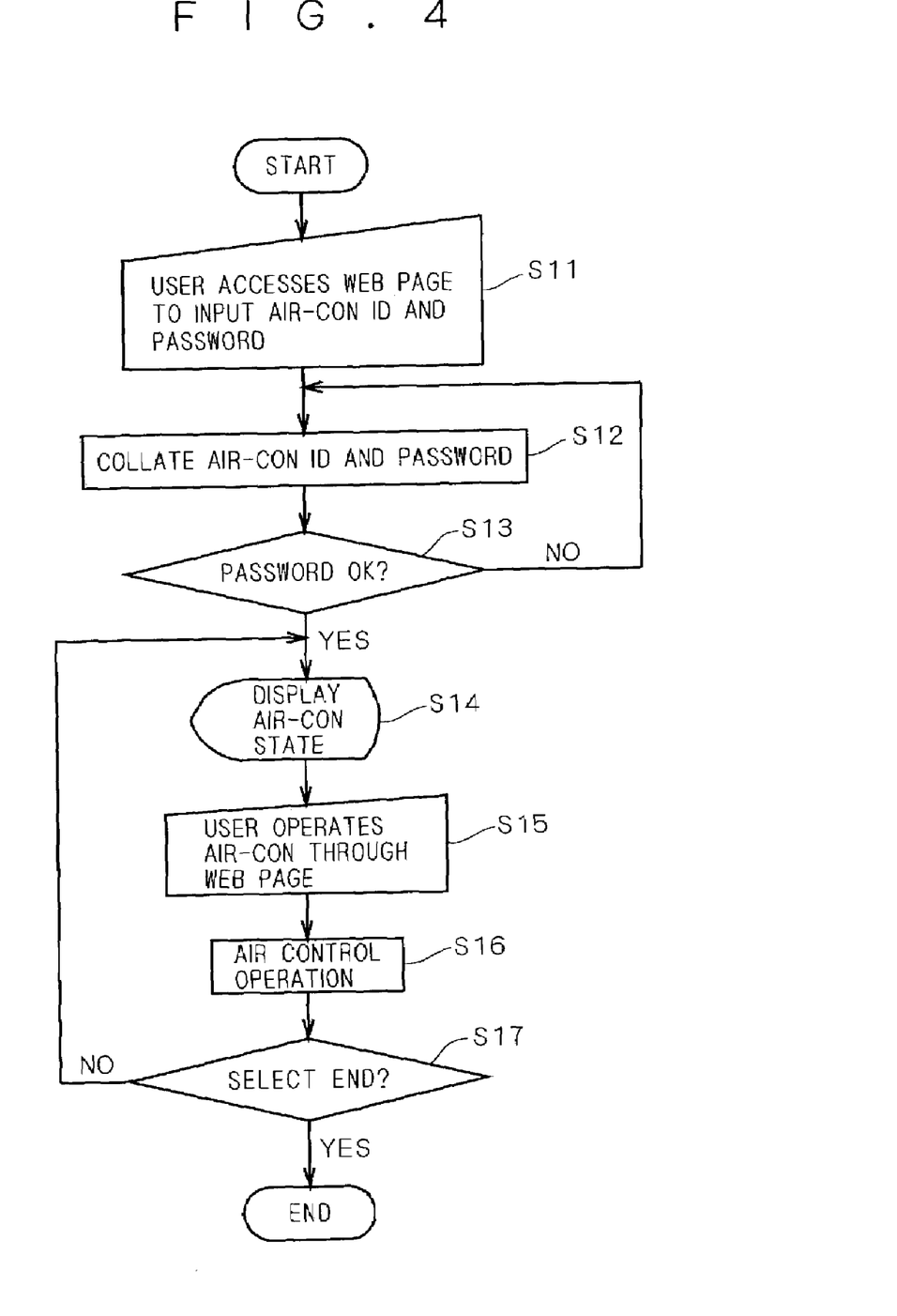
FIG. 4 is a flow chart that shows a remote control operation through the Internet in the remote control system of the electric apparatus according to the embodiment of the present invention.

Referring to a flow chart of FIG. 4, the following description will discuss remote control processes through the Internet, which are carried out when the user is out in the remote control system of the electric apparatus 11 having the above-mentioned arrangement. In this case, it is supposed that the detection result information detected by the various sensors has been transmitted to the tele-con server 26 from the electric apparatus (air conditioner) 11, and stored therein.

First, as shown in step S11 in FIG. 4, when the user is out, he or she connects the Internet communication device 14, 15 to the Internet 20, and specifies the IP address of the base station 12 so as to access the Web server 21 through the Internet 20. In this case, he or she inputs the ID number (ID of air conditioner) and the password in predetermined input frames. These pieces of information are transmitted to the Web server 21 through the Internet 20.

When the information corresponding to the air conditioner ID and the password has been inputted to the Web server 21, the Web server engine 21b transmits the air conditioner ID and the password to the user managing server 24.

At step S12, the user managing server 24 collates the air conditioner ID and the password given from the Web server 21 with the data base in the storing device 24a so as to identify the user. When it is determined at step S13 that the password is wrong, the process of step S12 is repeated. In contrast, when it is determined at step S13 that the password is correct, the sequence proceeds to step S14.

At step S14, detection result information stored in the tele-con server 26, for example, information indicating the current temperature is combined into one portion of the Web page (apparatus state displaying page) in the Web page data base 21a, and this is transmitted to the Internet communication device 14, 15 through the Internet 20. Moreover, at step S15, the Web server 21 transmits the Web page (control item page) in the Web page data base 21a to the Internet communication device 14, 15 through the Internet 20.

The user selects a desired control item on the Internet communication device 14, 15 which the user is currently operating. For example, in the personal computer 14, the user selects a desired control item by clocking one of a plurality of control items, for example, the item of "start of a cooling operation". Alternatively, in the cellular phone 15, the user selects a desired remote control item from a simple display panel within the cellular phone 15 by highlighting the display color of one of item characters to a complementary color while scrolling the screen.

Information concerning predetermined operations, such as the clicking operation and the scrolling operation, is transmitted to the Web server 21 through the Internet 20. Upon receipt of the information concerning to the control operations of the air conditioner, the Web server 21 transmits this information to the tele-con server 26 as instruction signals. At this time, the user managing server 24 transmits the telephone number of the electric apparatus 11 associated with the air conditioner ID to the tele-con server 26. On the basis of the telephone number given by the user managing server 24, the tele-con server 26 makes a connection to the communication circuit 11d of the electric apparatus 11 through the packet network 25, and also transmits a remote control signal to the communication circuit 11d of the Web server 21 on the basis of the instruction signal given by the Web server 21 (step S16).

In accordance with the remote control signal given from the tele-con server 26 of the base station 12 through the packet network 25 and the communication circuit 11d, the control system 11b of the electric apparatus 11 carries out a driving operation of the driving system 11a.

Then, at step S17, when the user does not execute the corresponding operation to terminate the Internet communication device 14, 15, the operations of steps S14 to S16 are repeated. In contrast, when the user executes the corresponding operation to terminate the operations, the operations are completed and the telephone connection is cut off.

As described above, the remote control system of the electric apparatus 11 carries out remote control operations by using Internet communication device 14, 15 having a plurality of platforms, such as a personal computer 14 and a cellular phone 15, so as to drive-control the electric apparatus 11; thus, it becomes possible to provide a wider range of Internet communication devices 14, 15 so as to be readily selected by the user.

Moreover, the functions and information for remote control operations of the user are defined in association with updateable software programs and Web pages in the storing device 27a, 27b, 27c, 24a within the base station 12; thus, these software programs and Web pages can be updated by the storing device 27a, 27b, 27c, 24a in the base station 12 so that it becomes possible to easily add new function and remote control item easily. In comparison with the conventional system in which a tele-con is placed in the vicinity of the electric apparatus, it is possible to easily add a function with respect to the remote control.

Moreover, the tele-con server 26 and the electric apparatus 11 are connected to each other through the packet network 25 serving as a communication network so that, upon updating the software program for specifying the operations of the tele-con server 26, it is only necessary to carry out the maintenance process on the base station 12.

Furthermore, billing charges for remote control operations with respect to the users are stored in a user managing table so that it is possible to carry out a fair billing process easily.

In the present embodiment, in order to supply information from the base station 12 to the respective Internet communication devices 14, 15, compact HTML is adopted as the description language of this information, and Web pages described in this compact HTML are supplied to the respective Internet communication devices 14, 15; however, any description language may be used as long as it is compatible with a plurality of platforms. Alternatively, a description language that is applied to only one of the personal computer 14 and the cellular phone 15 may be used.

As described above, the remote control system of an electric apparatus is provided with a base station 12 which carries out a remote control operation on the electric apparatus 11 having a predetermined driving system 11a through a predetermined communication network 25 and communication devices 13 to 15 which give instructions of the remote control operation of the above-mentioned driving system 11a to the above-mentioned base station through predetermined communication paths 20, 22, and the above-mentioned base station carries out the above-mentioned remote control operation on the basis of an updateable software program installed therein and the above-mentioned instructions.

While the invention has been shown and described in detail, the foregoing description is in all aspects illustrative and not restrictive. It is therefore understood that numerous other modifications and variations can be devised without departing from the scope of the invention.

What is claimed is:

1. A remote control system of an air conditioning apparatus comprising:

a base station (12) which carries out a remote control operation on an air conditioning apparatus (11) having a predetermined driving system (11a) through a predetermined communication network (25); and communication devices (13 to 15) which give instructions of the remote control operation of said driving system (11a) to said base station through predetermined communication paths (20, 22), wherein said communication devices input identification information and a password, and transmit said identification information and said password to said base station, said base station receives detection result information detected by a sensor of said driving system of said air conditioning apparatus from said air conditioning apparatus through said communication network, makes an identification of said identification information and said password transmitted from said communication devices, and transmits said detection result information to said communication devices only when said identification is successfully confirmed, said communication devices display or output as one portion of a voice guidance said detection result information transmitted from said base station, and said base station carries out said remote control operation on the basis of an updatable software program installed therein and said instructions when said identification is successively confirmed and after said detection result information is displayed or outputted as one portion of said voice guidance by said communication devices.

2. The remote control system of an air conditioning apparatus according to claim 1, wherein said detection result information includes at least information on room temperature detected by said sensor of said air conditioning apparatus.

3. The remote control system of an air conditioning apparatus according to claim 1, wherein said communication path includes: a first communication path (22) which connects one kind of communication device (13) to said base station; and a second communication path (20) which connects another kind of communication device (14, 15) to said base station.

4. The remote control system of an air conditioning apparatus according to claim 2, wherein said one kind of communication device (13) is a telephone, said first communication path (22) is a public line network, and said second communication path (20) is the Internet.

5. The remote control system of an air conditioning apparatus according to claim 4, comprising:

a first input unit (23) which inputs said instruction from said one kind of the communication device (13) through said first communication path (22); and a second input unit (21) which inputs said instruction from said another kind of communication device (14, 15) through said second communication path (20), wherein said first input unit (23) gives a voice guidance to said telephone (13) so as to select the items of said remote control, and said second input unit (21) gives a display guidance to said another kind of communication device (14, 15) so as to select the items of said remote control.

6. The remote control system of an air conditioning apparatus according to claim 4, wherein said another kind of communication device (14, 15) is at least one of the personal computer (14) and the cellular phone (15).

7. A remote control system of an air conditioning apparatus comprising:

a base station (12) which carries out a remote control operation on an air conditioning apparatus (11) having a predetermined driving system (11a) through a predetermined communication network (25);

one kind of communication device (13) which gives an instruction for a remote control operation of said driving system (11a) to said base station (12) through the first communication path (22); and another kind of communication device (14, 15) which gives an instruction for a remote control operation of said driving system (11a) to said base station (12) through a second communication path (20) which is different from said first communication path (22), wherein said communication devices input identification information and a password, and transmit said identification information and said password to said base station through each of said communications paths, said base station receives detection result information detected by a sensor of said driving system of said air conditioning apparatus from said air conditioning apparatus through said communication network, makes an identification of said identification information and said password transmitted from said communication devices through each of said communications paths, and transmits said detection result information to said communication devices through each of said communications paths only when said identification is successfully confirmed, said communication devices display or output as one portion of a voice guidance said detection result information transmitted from said base station, and said base station carries out said remote control operation on the basis of an updatable software program installed therein and said instructions when said identification is successively confirmed and after said detection result information is displayed or outputted as one portion of said voice guidance by said communication devices.

8. The remote control system of an air conditioning apparatus according to claim 7, wherein said detection result information includes at least information on room temperature detected by said sensor of said air conditioning apparatus.

9. A remote control method of an air conditioning apparatus, wherein said air conditioning apparatus (11) has a predetermined driving system (11a) which is drive-controlled by a predetermined operation unit (11c), said air conditioning apparatus (11) being remote-controlled through an external communication device (13 to 15), said method comprising the steps of:

(a) inputting identification information and a password and transmitting said identification information and said password to a predetermined base station (12) through predetermined communication paths (20, 22) by said communication devices;

(b) receiving detection result information detected by a sensor of said driving system of said air conditioning apparatus from said air conditioning apparatus through said communication network, making an identification of said identification information and said password transmitted from said communication devices, and transmitting said detection result information to said communication devices only when said identification is successfully confirmed, by said base station;

(c) displaying or outputting as one portion of a voice guidance said detection result information transmitted from said base station, by said communication devices;

(d) transmitting, after said step (c), when an input operation regarding a remote control operation of said air conditioning apparatus is performed, a signal for giving an instruction to said air conditioning apparatus in response to said input operation to said base station through said communication paths by said communication devices (13–15); and (e) transmitting, after said step (d), a remote control signal used for carrying out said remote control operation to said air conditioning apparatus (11) through a predetermined communication network (25) on the basis of a software program stored in said base station (12) in an updateable manner and said signal for giving an instruction to said air conditioning apparatus, by said base station.

10. The remote control method of an air conditioning apparatus according to claim 9, wherein
said communication path includes: a first communication path (22) which connects one kind of communication device (13) to said base station; and a second communication path (20) which connects another kind of communication device (14, 15) to said base station,
said one kind of communication device (13) is a telephone,
said another kind of communication device (14, 15) is at least one of the personal computer (14) and the cellular phone (15),
said first communication path (22) is a public line network,
said first input unit (23) gives voice guidance to said telephone so as to select the items of said remote control,
said second communication path (20) is the internet, and
said second input unit (21) gives a display guidance to said another kind of communication device (14, 15) so as to select the items of said remote control.

11. The remote control method of an air conditioning apparatus according to claim 9, wherein
said detection result information includes at least information on room temperature detected by said sensor of said air conditioning apparatus.

12. A base station (12) carrying out a remote control operation on an air conditioning apparatus (11) having a predetermined driving system (11a) through a predetermined communication network (25) on the basis of an instruction given from a predetermined communication device (13 to 15) through a predetermined communication path (20, 22), wherein
said communication path includes: a first communication path (22) which connects one kind of communication device (13) to said base station; and a second communication path (20) which connects another kind of communication device (14, 15) to said base station, and
said base station receives detection result information detected by a sensor of said driving system of said air conditioning apparatus from said air conditioning apparatus through said communication network, makes, when identification information and a password are transmitted from said communication devices through each of said communications paths, an identification of said identification information and said password, transmits said detection result information to said communication devices through each of said communications paths only when said identification is successfully confirmed, and carries out said remote control operation on the basis of an updatable software program installed therein and said instructions when said identification is successively confirmed and after said detection result information is displayed or outputted as one portion of said voice guidance by said communication devices.

13. The base station according to claim 12, wherein
said detection result information includes at least information on room temperature detected by said sensor of said air conditioning apparatus.

14. A base station carrying out a remote control operation on an air conditioning apparatus (11) having a predetermined driving system (11a) through a predetermined communication network (25) on the basis of an instruction that is given from one kind of communication device (13) through a predetermined first communication path (22), or given from the other kind of communication device (14, 15) through a predetermined second communication path (20), wherein
said base station receives detection result information detected by a sensor of said driving system of said air conditioning apparatus from said air conditioning apparatus through said communication network, makes, when identification information and a password are transmitted from said communication devices through each of said communications paths, an identification of said identification information and said password, transmits said detection result information to said communication devices through each of said communications paths only when said identification is successfully confirmed, and carries out said remote control operation on the basis of an updatable software program installed therein and said instructions when said identification is successively confirmed and after said detection result information is displayed or outputted as one portion of said voice guidance by said communication devices.

15. The base station for carrying out a remote control operation on an air conditioning apparatus according to claim 14, wherein
a billing process for charge, which corresponds to the remote control by way of said base station, is carried out.

16. The base station carrying out a remote control operation on an air conditioning apparatus according to claim 14, wherein
said one kind of communication device (13) is a telephone,
said first communication path (22) is a public line network,
said second communication path (20) is the Internet,
said base station comprises:

a first input unit (23) which inputs said instruction from said one kind of communication device (13) through said first communication path (22); and a second input unit (21) which inputs said instruction from said another kind of communication device (14, 15) through said second communication path (20), said first input unit (23) gives a voice guidance to said telephone (13) so as to select the items of said remote control, and said second input unit (21) gives a display guidance to said another kind of communication device (14, 15) so as to select the items of said remote control.

17. The base station according to claim 14, wherein said detection result information includes at least information on room temperature detected by said sensor of said air conditioning apparatus.

* * * * *